United States Patent
Shiga

(10) Patent No.: US 11,106,238 B2
(45) Date of Patent: Aug. 31, 2021

(54) IC CARD AND PORTABLE ELECTRONIC DEVICE

(71) Applicants: KABUSHIKI KAISHA TOSHIBA, Minato-ku (JP); Toshiba Infrastructure Systems & Solutions Corporation, Kawasaki (JP)

(72) Inventor: Akinori Shiga, Kawasaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 233 days.

(21) Appl. No.: 16/558,687

(22) Filed: Sep. 3, 2019

(65) Prior Publication Data
US 2020/0089271 A1  Mar. 19, 2020

(30) Foreign Application Priority Data
Sep. 18, 2018 (JP) .............................. JP2018-174203

(51) Int. Cl.
*G06F 1/12* (2006.01)
*G06K 19/07* (2006.01)
(Continued)

(52) U.S. Cl.
CPC .................. *G06F 1/12* (2013.01); *G06F 1/08* (2013.01); *G06K 19/0723* (2013.01); *G06K 19/07345* (2013.01)

(58) Field of Classification Search
CPC ........................................................ G06F 1/12
(Continued)

(56) References Cited

U.S. PATENT DOCUMENTS 6,076,171 A  6/2000 Kawata
7,403,122 B1  7/2008 Koepp et al.
(Continued)

FOREIGN PATENT DOCUMENTS

CN  101013477 A  8/2007
JP  10-268963 A  10/1998
(Continued)

OTHER PUBLICATIONS

Extended European Search Report dated Feb. 10, 2020 in European Patent Application No. 19195288.6, citing documents AA and AB therein, 7 pages.
(Continued)

*Primary Examiner* — Allyson N Trail
(74) *Attorney, Agent, or Firm* — Oblon, McClelland, Maier & Neustadt, L.L.P.

(57) ABSTRACT

According to one embodiment, an IC card includes an antenna, a first oscillator, and a first processor. The first oscillator is configured to output a first clock signal of a first frequency, and output a second clock signal of a second frequency that is higher than the first frequency as requested. The first processor is configured to operate based on the first clock signal when not during an execution period of first processing corresponding to a reception command received by the antenna, request the second clock signal for executing the first processing, and execute the first processing based on the second clock signal of the first oscillator that receives the request.

9 Claims, 5 Drawing Sheets

(51) Int. Cl.
 *G06K 19/073* (2006.01)
 *G06F 1/08* (2006.01)
(58) Field of Classification Search
 USPC .......................................................... 713/400
 See application file for complete search history.

(56) References Cited

U.S. PATENT DOCUMENTS

| | | |
|---|---|---|
| 9,230,255 B1 | 1/2016 | Hanmer |
| 2007/0147476 A1* | 6/2007 | Merz .................. H04B 1/71632 375/130 |
| 2016/0132761 A1 | 5/2016 | Hanmer |
| 2016/0164725 A1* | 6/2016 | Wu ....................... H04W 12/04 713/168 |
| 2017/0337417 A1 | 11/2017 | Lowe et al. |

FOREIGN PATENT DOCUMENTS

| | | | |
|---|---|---|---|
| JP | 2003-331238 A | 11/2003 |
| JP | 2008-217613 A | 9/2008 |
| JP | 2012-238126 A | 12/2012 |
| JP | 2015-170268 A | 9/2015 |

OTHER PUBLICATIONS

Written Opinion dated Apr. 16, 2020 in corresponding Singaporean Patent Application No. 10201908138U, citing documents AA and AO therein, 7 pages.

* cited by examiner

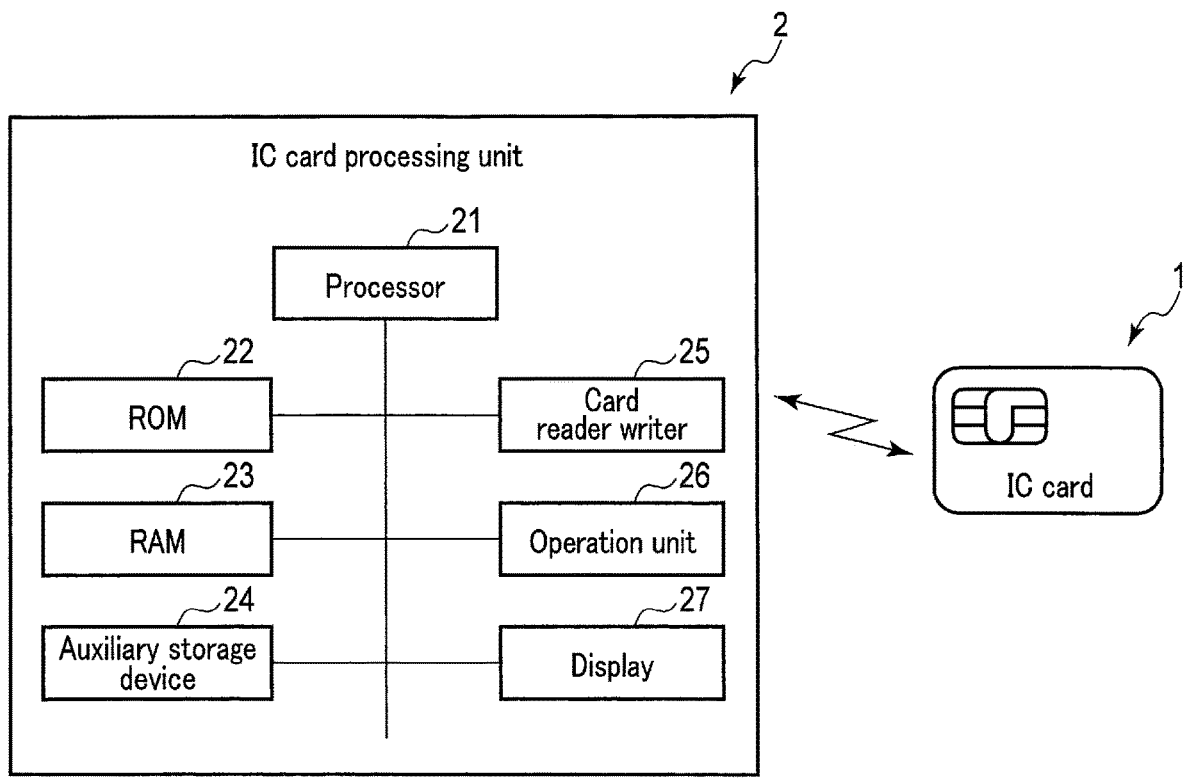
F I G. 1
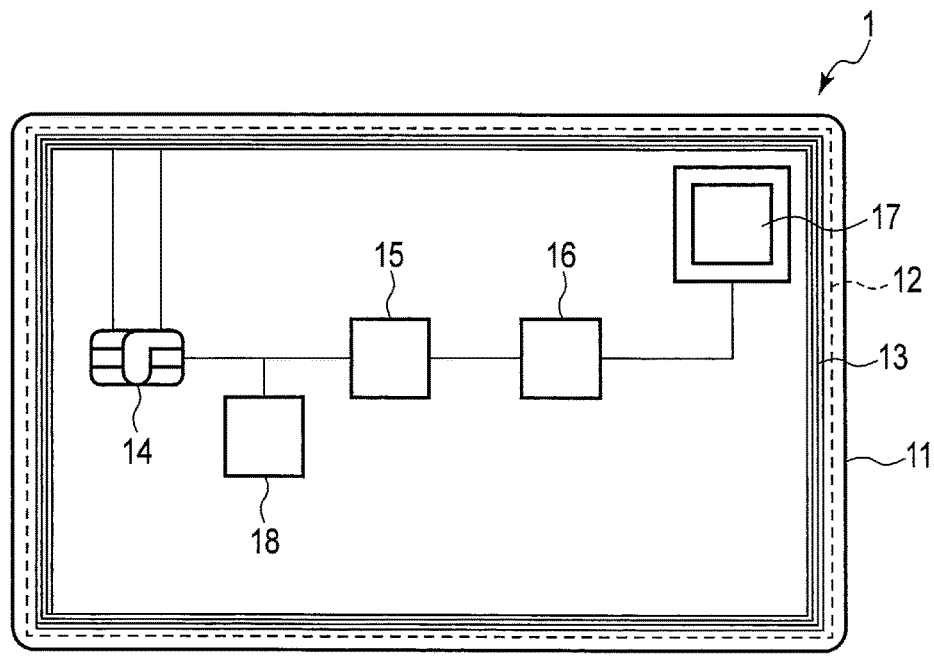
F I G. 2

IC CARD AND PORTABLE ELECTRONIC DEVICE

CROSS-REFERENCE TO RELATED APPLICATIONS

This application is based upon and claims the benefit of priority from Japanese Patent Application No. 2018-174203, filed Sep. 18, 2018, the entire contents of which are incorporated herein by reference.

FIELD

Embodiments described herein relate generally to an IC card and a portable electronic device.

BACKGROUND

In recent years, an IC card that includes an integrated circuit (IC) chip has been widely spread. Since the IC card is of a portable size, it is sometimes called a portable electronic device. The IC card is not only used for credit cards, commuter passes, and other settlements of commercial transactions, but is also used as identification cards (IDs), such as employee IDs, membership IDs, and insurance IDs, in various fields.

The IC card may be roughly divided into a contact type and a non-contact type. Since the contact type IC card operates by power fed by a contact terminal, it can obtain a sufficient supply current from a terminal of an IC card reader/writer, etc. On the other hand, since the non-contact type IC card operates by power supplied in a non-contact manner via an antenna, there is a possibility that a small amount of current is obtained from a terminal, or that, if there is distance between the terminal and the card, sufficient power for operation may not be obtained.

For example, an advanced IC card with a fingerprint authentication function is known. However, since such advanced IC card executes processing with a heavy load, such as image processing, the advanced IC card is realized by the contact type IC card where sufficient power can be obtained. Since there is a possibility that sufficient power may not be obtained, this is difficult to be realized by the non-contact type IC card.

Furthermore, there is known a mechanism for automatically lowering a frequency of an oscillator inside an IC chip of an IC card (inner oscillating frequency) depending on the power supply amount, and reducing a power amount necessary for operation.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention FIG. 1 is a block diagram showing an example of an IC card system according to an embodiment.

FIG. 2 is a top view showing an example of an IC card according to the embodiment.

DETAILED DESCRIPTION

Figure 3:
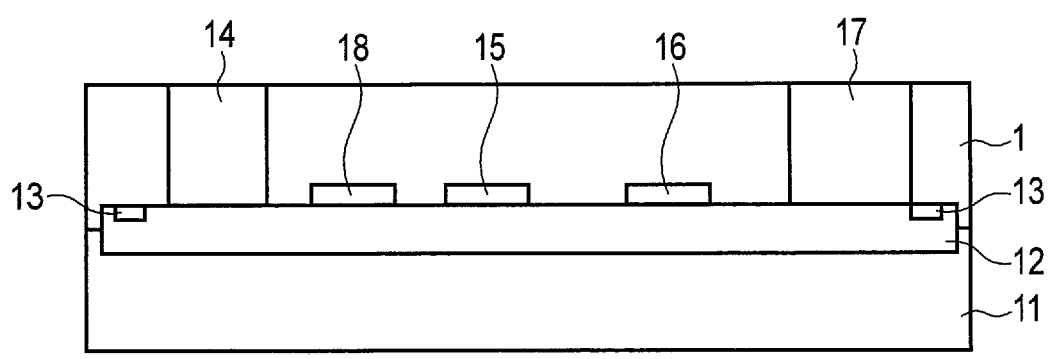
FIG. 3 is a cross-sectional view showing an example of the IC card according to the embodiment.

In the following, an IC card system according to an embodiment will be explained with reference to the drawings.

In general, an IC card includes an antenna, a first oscillator, a first processor, a second oscillator, and a second processor. The first oscillator is configured to output a first clock signal of a first frequency, and output a second clock signal of a second frequency that is higher than the first frequency as requested. The first processor is configured to operate by a current induced electromagnetically in the antenna, operate based on the first clock signal when not during an execution period of first processing corresponding to a reception command received by the antenna, request the second clock signal for executing the first processing, execute the first processing based on the second clock signal of the first oscillator that receives the request, and instruct to execute second processing corresponding to the reception command received by the antenna. The second oscillator is configured to output a third clock signal of a third frequency, and output a fourth clock signal of a fourth frequency that is higher than the third frequency as requested. The second processor is configured to operate by a current induced electromagnetically in the antenna, operate based on the third clock signal when not during an execution period of the second processing, request the fourth clock signal for executing the second processing based on an instruction to execute the second processing from the first processor, and execute the second processing based on the fourth clock signal of the second oscillator that receives the request.

FIG. 1 is a block diagram showing an example of an IC card system according to an embodiment. As shown in FIG. 1, the IC card system comprises an IC card 1 and an IC card processing unit 2 for processing an IC card.

The IC card 1 is, for example, a card in the size of 85.6 mm×54 mm×0.76 mm, and is a portable electronic device assumed to be portable for a user. Furthermore, the IC card may also be referred to as a smart card, etc. The IC card 1 is a non-contact type IC card that obtains operating power by non-contact power supply. That is, when the IC card 1 enters a communication area (magnetic field area) of a card reader writer of the IC card processing unit 2, an antenna (coil) of the IC card 1 is activated by electromagnetic induction, and is operated by the induced current. In the present embodiment, an IC card referred to as a combination type that supports both functions of a non-contact type that communicates with the IC card processing unit 2 in a non-contacting manner, and a contact type that communicates with the IC card processing unit 2 in a contacting manner will be explained. The operation and processing explained in the present embodiment can also be applied to the non-contact type IC card.

The IC card processing unit 2 is installed at entrances and exits of facilities such as shops or stations, communicates with the IC card 1 that is held up by a user, and transmits information to the IC card 1, or receives information from the IC card 1. A number of IC cards 1 circulate the market, and the IC card processing unit 2 installed at each location communicates with the IC card 1 that is held up by the user.

Here, a schematic configuration of the IC card processing unit 2 will be explained. The IC card processing unit 2 comprises a processor 21, a read-only memory (ROM) 22, a random-access memory (RAM) 23, an auxiliary storage device 24, a card reader writer 25, an operation unit 26, and a display 27, etc.

The processor 21 corresponds to a central portion of a computer that executes various types of processing, such as calculation and control necessary for operating the IC card processing unit 2, based on a program stored at least in one of the ROM 22 and the auxiliary storage device 24. The processor 21 is, for example, a central processing unit (CPU) or a micro processing unit (MPU). The IC card processing unit 2 may also combine two or more processors 21 and execute various types of processing by having these two or more processors cooperate with each other.

For example, by executing the program, the processor 21 has a function of transmitting a command to the IC card 1 by the card reader writer 25, and a function of executing processing based on data such as a response received from the IC card 1, etc. By these functions, the processor 21 transmits data that input to the operation unit 26, etc. or a write command that includes write data to the IC card 1 via the card reader writer 25.

The ROM 22 is a nonvolatile memory dedicated to reading that corresponds to a main storage portion of the processor 21 corresponding to a computer. The ROM 22 stores a program, such as an operating system or an application software. The ROM 22 also stores data, etc. that the processor 21 uses upon performing various types of processing.

The RAM 23 is a nonvolatile memory that corresponds to a main storage portion of the processor 21 corresponding to a computer. The RAM 23 is utilized as a so-called work area for storing data temporarily used by the processor 21 upon performing various types of processing.

The auxiliary storage device 24 corresponds to an auxiliary storage portion of the processor 21 corresponding to a computer. The auxiliary storage device 24 is, for example, an electric erasable programmable read-only memory (EE-PROM) (Trademark), a hard disk drive (HDD), or a solid state drive (SSD). In some cases, the auxiliary storage device 24 stores a part of or all of the above-mentioned programs. Furthermore, the auxiliary storage device 24 stores data to be used by the processor 21 when performing various types of processing, data generated by the various types of processing performed by the processor 21, or various setting values, etc.

The card reader writer 25 is an interface device for transmitting/receiving data to/from the IC card 1. The card reader writer 25 comprises an antenna, a contact terminal, and a communication controller, etc., communicates with a combination type or non-contact type IC card 1 (the antenna of the IC card 1) in a non-contacting manner via the antenna, and communicates with the combination type IC card (the contact terminal of the IC card) by physical and electrical connection via the contact terminal.

The operation unit 26 receives an input instruction from an operator of the IC card processing unit 2. The operation unit 26 transmits input data corresponding to the received input instruction to the processor 21. The operation unit 26 is, for example, a keyboard, a ten key, and a touch panel.

The display 27 is a display device that displays various information under the control of the processor 21. The display 27 is, for example, a liquid crystal monitor. For example, the display 27 may be formed integrally with the operation unit 26.

FIG. 2 is a top view showing an example of an IC card according to the embodiment. Furthermore, FIG. 3 is a cross-sectional view showing an example of the IC card according to the embodiment. As shown in FIG. 2 and FIG. 3, the IC card 1 may be configured by, such as, a plastic card base material 11. An electronic board 12 is provided on the card base material 11. On the electronic board 12 is provided an antenna (coil) 13, a contact terminal 14, a secure IC chip 15, an image processing IC chip 16, a fingerprint sensor 17, and a charge unit 18. In the present embodiment, the IC card 1 comprising two IC chips will be explained; however, the IC card may comprise three or more IC chips, or one IC chip. Furthermore, in the present embodiment, the IC card will be explained as comprising the charge unit 18; however, the IC card may also not comprise the charge unit 18.

When entering the communication area (magnetic field area) of the antenna of the card reader writer 25, the antenna 13 of the IC card 1 is activated by electromagnetic induction, and generates a current. The antenna 13 is connected to the contact terminal 14, the contact terminal 14 is connected to the secure IC chip 15, and the secure IC chip 15 is connected to the image processing IC chip 16, and the image processing IC chip 16 is connected to the fingerprint sensor 17.

For example, the secure IC chip 15 operates as a master IC chip, and the image processing IC chip 16 operates as a slave IC chip. The secure IC chip 15 controls communication with the card reader writer 25. The secure IC chip 15 also executes fingerprint authentication processing, etc. The image processing IC chip 16 executes image acquisition processing for acquiring a read fingerprint image output from the fingerprint sensor 17, and image processing for extracting a plurality of features from the read fingerprint image, and generating a read fingerprint image template based on the plurality of features.

The fingerprint sensor 17 is a capacitance, an optical, or an ultrasonic sensor, reads a fingerprint from a finger placed on the fingerprint sensor 17, and outputs a fingerprint image obtained by the reading result to the image processing IC chip 16. The sensing scheme of the fingerprint sensor 17 is not limited to the above, and may be another sensing scheme.

The charge unit 18 includes a chargeable and dischargeable device, such as an electrical double capacitor (EDLC) or a secondary battery, and is charged by the current induced in the (coil) antenna 13. Furthermore, the current discharged from the charge unit 18 is supplied to the secure IC chip 15 and the image processing IC chip 16, and the secure IC chip 15 and the image processing IC chip 16 operate by the current discharged from the charge unit 18. The thickness of the IC card 1 is approximately 0.76 mm, and the capacity of the charge unit 18 mounted on the IC card 1 is approximately several mFs to several tens of mFs. Furthermore, the charge unit 18 detects the residual capacity in real time, and notifies the residual capacity to the secure IC chip 15 and the image processing IC chip 16. In a case where the IC card 1 does not include the charge unit 18, the current induced in the antenna 13 is supplied to the secure IC chip 15 and the image processing IC chip 16.

When using the IC card 1, the user places a finger on the fingerprint sensor 17 and holds or inserts the IC card 1 above or into the card reader writer 25. The antenna (coil) of the IC card 1 is activated by electromagnetic induction, and the fingerprint sensor 17 reads the fingerprint of the fingertip by using the induced current, and outputs a fingerprint image. The secure IC chip 15 and the image processing IC chip 16 of the IC card 1 cooperate with each other to execute the fingerprint authentication processing based on the fingerprint image.

Figure 4:
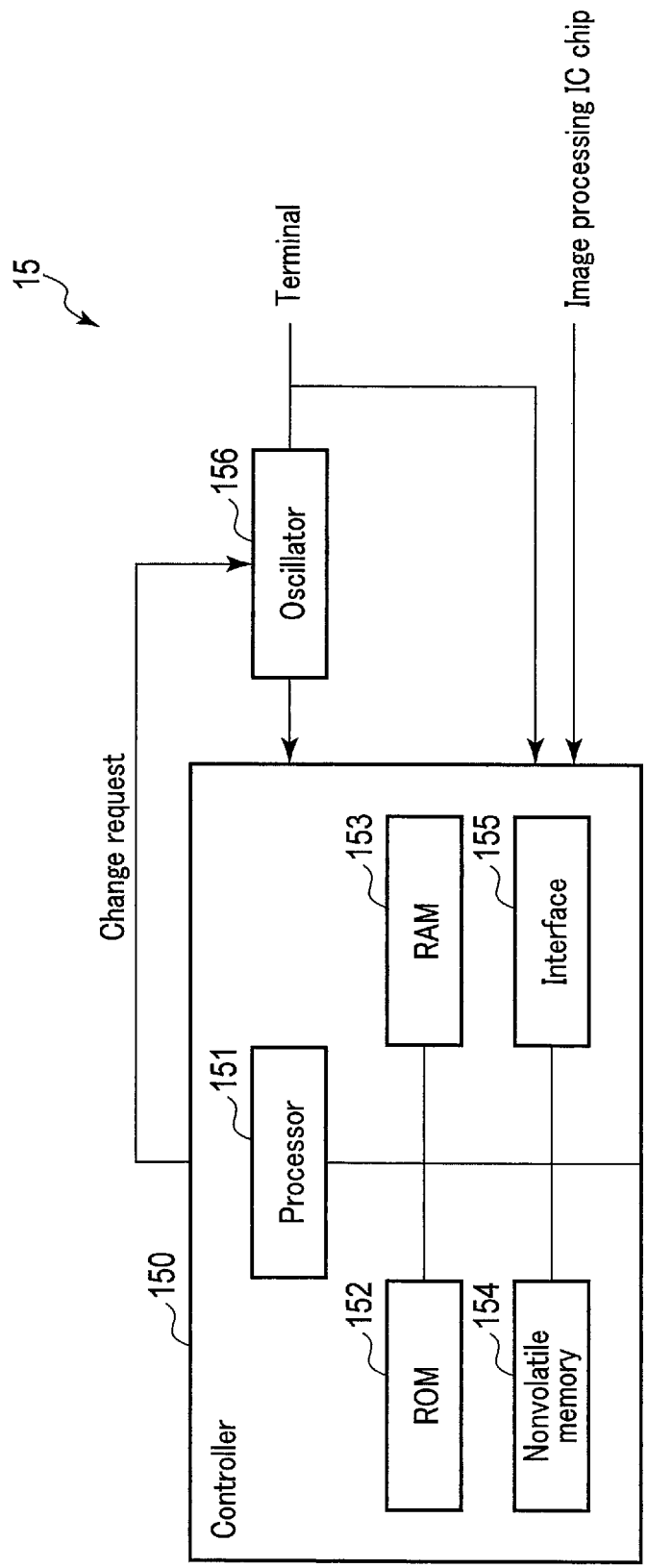
FIG. 4 is a block diagram showing a schematic configuration of a secure IC chip of the IC card according to the embodiment.

FIG. 4 is a block diagram showing a schematic configuration of the secure IC chip of the IC card according to the embodiment. As shown in FIG. 4, the secure IC chip 15 comprises a controller 150 and an oscillator 156, etc., and the controller 150 comprises a processor 151, a ROM 152, a RAM 153, a nonvolatile memory 154, and an interface 155, etc.

The processor 151 corresponds to a central portion of a computer that executes various types of processing, such as calculation and control necessary for operating the secure IC chip 15, based on a program stored at least in one of the ROM 152 and the nonvolatile memory 154. The processor 151 is, for example, a central processing unit (CPU) or a micro processing unit (MPU). The secure IC chip 15 may also combine two or more processors 151 and execute various types of processing by the cooperation between these two or more processors.

For example, by executing the program, the processor 151 has a function of interpreting the command transmitted from the card reader writer 25 and received via the antenna 13 to execute processing based on the command, and a function of transmitting a response to the card reader writer 25 by the antenna 13. The processor 151 also executes card authentication processing based on a card authentication command.

The processor 151 senses the residual capacity notified by the charge unit 18, and senses a current value obtained by the non-contact power supply. Furthermore, the processor 151 changes operating frequencies between during and not during an execution period of the processing corresponding to the command. For example, the processor 151 changes the operating frequency based on operating frequency change information stored in the nonvolatile memory 154. When not during the execution period of the processing corresponding to the command, the processor 151 operates based on a first clock signal of a first frequency, and, when during the execution period of the processing corresponding to the command, the processor 151 operates based on a second clock signal of a second frequency that is higher than the first frequency. Details will be explained later on.

Furthermore, the processor 151 commands the image processing IC chip 16 to perform the processing corresponding to the command, and controls the operating frequency of the image processing IC chip 16. For example, the processor 151 commands the image processing IC chip 16 to change the operating frequencies between during and not during the execution period of the processing corresponding to the command based on the operating frequency change information stored in the nonvolatile memory 154.

The ROM 152 is a nonvolatile memory dedicated to reading that corresponds to a main storage portion of the processor 151. The ROM 152 stores a program, such as an operating system or an application software. The ROM 152 also stores data, etc. that the processor 151 uses upon performing various types of processing.

The RAM 153 is a nonvolatile memory that corresponds to a main storage portion of the processor 151. The RAM 153 is utilized as a so-called work area for storing data temporarily used by the processor 151 upon performing various types of processing.

The nonvolatile memory 154 corresponds to an auxiliary storage portion of the processor 151. The nonvolatile memory 154 is, for example, EEPROM. In some cases, the nonvolatile memory 154 stores a part of or all of the above-mentioned programs. Furthermore, the nonvolatile memory 154 stores data to be used by the processor 151 when performing various types of processing, data generated by the various types of processing performed by the processor 151, or various setting values, etc.

The nonvolatile memory 154 also stores the operating frequency change information for operating frequency change processing executed by the processor 151 and a processor 161. The operating frequency change information includes a command list in which command identification information to be the target of the operating frequency change processing in each of the processor 151 and the processor 161 is registered. Furthermore, the operating frequency change information includes operating frequencies to be the change target in each of the processor 151 and the processor 161. For example, the operating frequencies to be the change target in the processor 151 are first and second operating frequencies, and the operating frequencies to be the change target in the processor 161 are third and fourth operating frequencies. Furthermore, the operating frequency change information includes information regarding the change timing of the operating frequencies in each of the processor 151 and the processor 161. For example, the operating frequency change information includes information regarding a timing at which, in the processor 151, the first operating frequency is applied when not during the execution period of the command processing, and the second operating frequency is applied when during the execution period of the command processing. Furthermore, the operating frequency change information includes information regarding a timing at which, in the processor 161, the third operating frequency is applied when not during the execution period of the command processing, and the fourth operating frequency is applied when during the execution period of the command processing. The operating frequency change information includes a capacity threshold for determining the residual capacity of the charge unit 18. The operating frequency change information also includes a current threshold for determining the current value obtained by the non-contact power supply. In the case where the processor 151 and the processor 161 independently perform the operating frequency change processing, the nonvolatile memory 154 stores the operating frequency change information for the operating frequency change processing executed by the processor 151, and the nonvolatile memory 164 stores the operating frequency change information for the operating frequency change processing executed by the processor 161.

For example, the operating frequency change information stored in the nonvolatile memory 154 may be rewritten by the IC card processing unit 2. In this manner, the operating frequency change information can be set in accordance with the usage environment of the IC card 1 or the processing load of the command executed by the IC card 1, etc., and the operating frequency change processing can be realized in accordance with the usage environment of the IC card 1 or the processing load of the command executed by the IC card 1, etc. Although there are differences in the individual characteristics of each IC card 1, the operating frequency change information can be set in consideration of such differences in the characteristics.

Furthermore, the nonvolatile memory 154 registers a registered fingerprint image template for the fingerprint authentication. The nonvolatile memory 154 may register a plurality of registered fingerprint image templates obtained by reading the fingertip of one finger a number of times, or may register a plurality of registered fingerprint image templates obtained by reading fingertips of a plurality of fingers once or a number of times. The registered fingerprint image template is generated based on a plurality of features extracted from the fingerprint image.

The interface 155 communicates with the image processing IC chip 16 and receives the read fingerprint image template generated by the image processing IC chip 16. The interface 155 also receives a command, etc. transmitted from the contact terminal 14.

The oscillator 156 outputs one of a plurality of clock signals corresponding to a plurality of frequencies. For example, the oscillator 156 outputs one of the first clock signal corresponding to the first frequency and the second clock signal corresponding to the second frequency that is higher than the first frequency. The oscillator 156 receives a power supply and starts output of the first clock signal. Alternatively, the oscillator 156 receives a clock request from the processor 151 and starts output of the first clock signal. Furthermore, the oscillator 156 receives a request for operating frequency change (changing the first clock signal to the second clock signal (speed up)) from the processor 151, switches the first clock signal to the second clock signal, and outputs it.

Furthermore, the oscillator 156 receives a request for operating frequency change (changing the second clock signal to the first clock signal (slow down)) from the processor 151, switches the second clock signal to the first clock signal, and outputs it.

Figure 5:
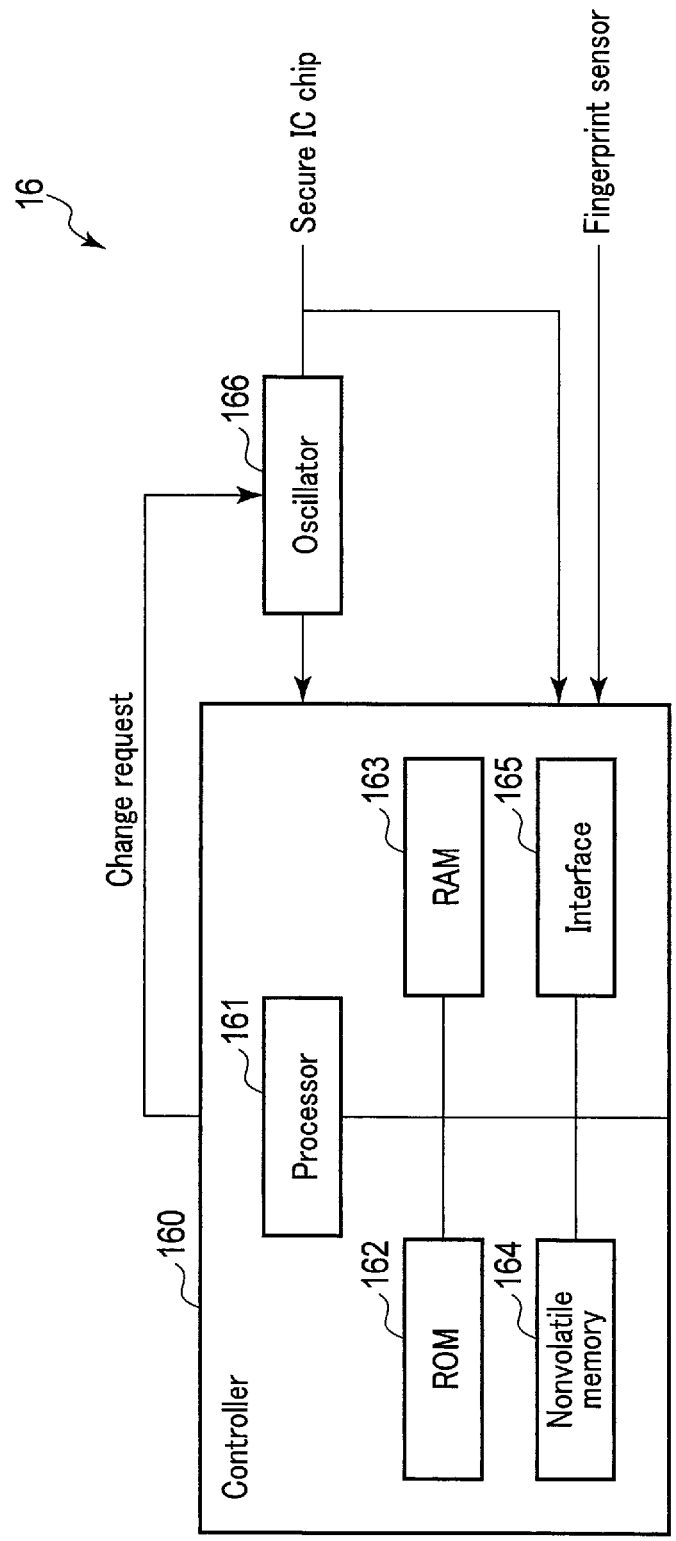
FIG. 5 is a block diagram showing a schematic configuration of an image processing IC chip of the IC card according to the embodiment.

FIG. 5 is a block diagram showing a schematic configuration of an image processing IC chip of the IC card according to the embodiment. As shown in FIG. 5, the image processing IC chip 16 comprises a controller 160 and an oscillator 166, etc., and the controller 160 comprises a processor 161, a ROM 162, a RAM 163, a nonvolatile memory 164, and an interface 165, etc. The basic configurations of each part of the image processing IC chip 16 and each part of the secure IC chip 15 are substantially the same. Therefore, the differences thereof will be mainly explained, and explanations on the common portions will be omitted.

For example, the processor 161 executes image acquisition processing for acquiring the read fingerprint image output from the fingerprint sensor 17, and image processing for extracting a plurality of features from the read fingerprint image, and generating the read fingerprint image template based on the plurality of features. The interface 165 communicates with the fingerprint sensor 17, and communicates with the secure IC chip 15.

The processor 161 senses the residual capacity notified by the charge unit 18, and senses the current value obtained by the non-contact power supply.

Furthermore, the processor 161 changes operating frequencies between during and not during an execution period of the processing corresponding to the command. For example, in the case where the processor 151 operates as a master, and the processor 161 operates as a slave, the processor 161 changes the operating frequency based on the instruction from the processor 151, and executes the processing corresponding to the command. Alternatively, in the case where the processor 151 and the processor 161 operate independently, the processor 161 changes the operating frequency based on the operating frequency change information stored in the nonvolatile memory 164. When not during the execution period of the processing corresponding to the command, the processor 161 operates based on a third clock signal of a third frequency, and, when during the execution period of the processing corresponding to the command, the processor 161 operates based on a fourth clock signal of a fourth frequency that is higher than the third frequency.

The oscillator 166 outputs one of a plurality of clock signals corresponding to a plurality of frequencies. For example, the oscillator 166 outputs one of the third clock signal corresponding to the third frequency and the fourth clock signal corresponding to the fourth frequency that is higher than the third frequency. The oscillator 166 received a power supply and starts output of the third clock signal. Alternatively, the oscillator 166 receives a clock request from the processor 161 and starts output of the third clock signal. Furthermore, the oscillator 166 receives a request for an operating frequency change (changing a third clock frequency to a fourth clock frequency (speedup)) from the processor 161, switches the third clock signal to the fourth clock signal, and outputs it. Furthermore, the oscillator 166 receives a request for an operating frequency change (changing the fourth clock frequency to the third clock frequency (slow down)) from the processor 161, switches the fourth clock signal to the third clock signal, and outputs it.

The first frequency and the third frequency may be substantially identical frequencies or may be different frequencies. That is, the first clock signal and the third clock signal may be substantially identical frequencies or may be different frequencies. Similarly, the second frequency and the fourth frequency may be substantially identical frequencies or may be different frequencies. That is, the second clock signal and the fourth clock signal may be substantially identical frequencies or may be different frequencies. Since there are individual differences between the oscillator 156 and the oscillator 166, even if they are designed to output the same frequencies, they may not always be able to output signals of completely the same frequencies.

Now, measures for suppressing electric power consumption while maintaining constant processing performance will be explained. In order to suppress electric power consumption, the frequency of the oscillator inside each IC chip in the IC card may be lowered; however, in this case, the processing performance may deteriorate. Therefore, in the IC card 1 of the present embodiment, in the case where the processing load of the IC chip (referred to as first IC chip) of one of the secure IC chip 15 and the image processing IC chip 16 is heavier than the processing load of the other IC chip (referred to as second IC chip), the IC chip (first IC chip) is operated by the clock signal of the higher frequency, and the other IC chip (second IC chip) is operated by the clock signal of the lower frequency. Furthermore, in the case where the processing load of the other IC chip (second IC chip) is heavier than the processing load of the IC chip (first IC chip), the other IC chip (second IC chip) is operated by the clock signal of the higher frequency, and the IC chip (first IC chip) is operated by the clock signal of the lower frequency. For example, the IC chip (secure IC chip 15) that functions as the master controls switching of the clock signals of each IC chip. Alternatively, each IC chip may be designed to control switching of its own clock signal.

Figure 6:
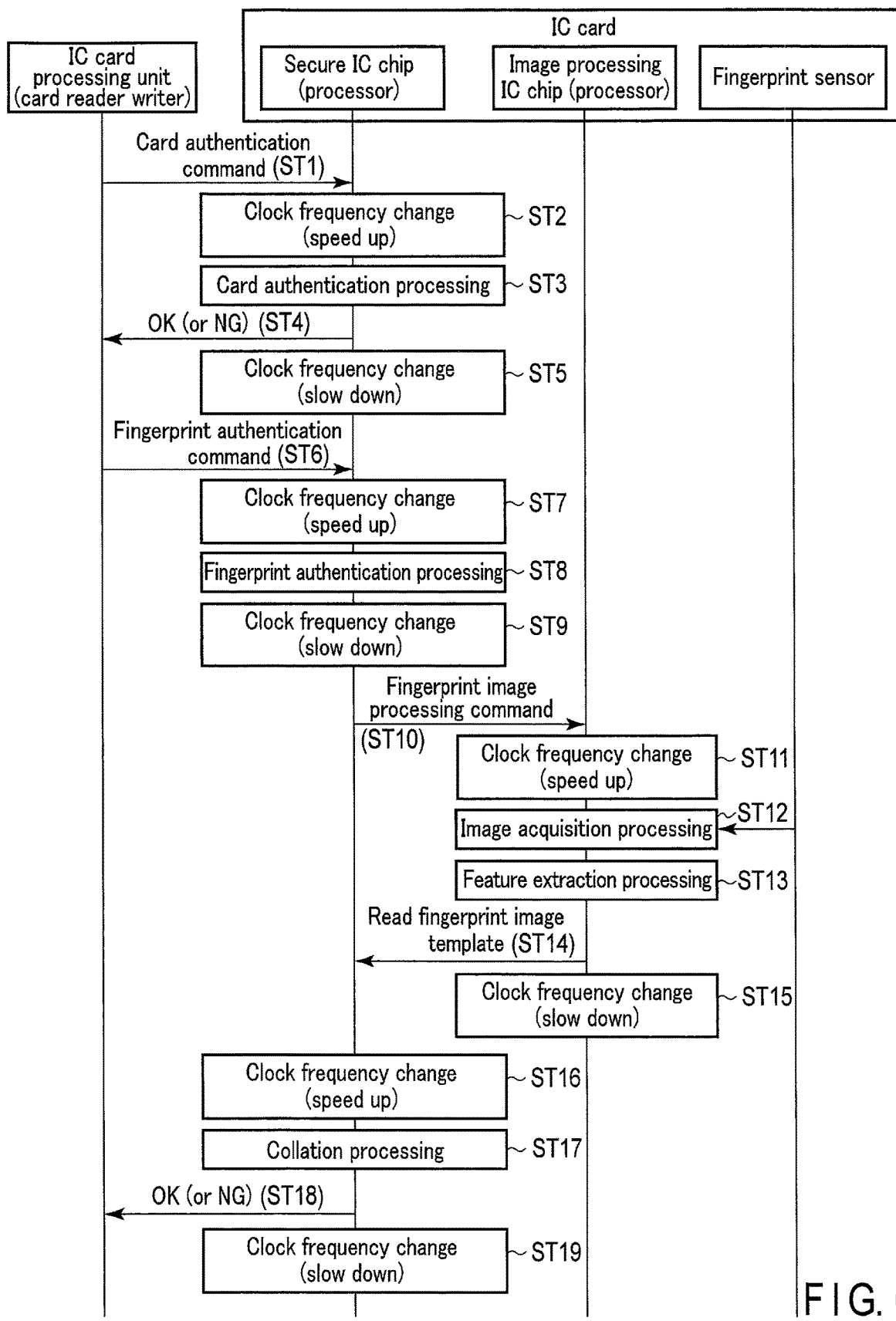
FIG. 6 shows an example of operation sequences of an IC card processing unit and the IC card, and an operation sequence inside the IC card.

FIG. 6 shows an example of operation sequences of the IC card processing unit and the IC card, and an operation sequence inside the IC card. In the present embodiment, a case in which the two IC chips (secure IC chip 15 and image processing IC chip 16) of the IC card 1 cooperate with each other to execute authentication processing (card authentication processing and fingerprint authentication processing), and the frequency change processing is applied to such authentication processing will be explained.

The card reader writer 25 of the IC card processing unit 2 outputs a polling signal and waits for a response from the IC card 1. When a user holds the IC card 1 above the card reader writer 25, and the antenna 13 of the IC card 1 enters the communication area of the card reader writer 25, the antenna 13 of the IC card 1 is activated by electromagnetic induction, and the IC card 1 obtains an operating current and operates. The processor 151 of the secure IC chip 15 senses the polling signal received via the antenna 13, and returns a response signal via the antenna 13.

When the IC card 1 obtains the operating current by the electromagnetic induction of the antenna 13, the oscillator 156 outputs the first clock signal of the first operating frequency in accordance with the input of the signal received via the antenna 13, and the oscillator 166 outputs the third clock frequency of the third operating frequency in accordance with the input of the signal received via the antenna 13. That is, when the IC card 1 is held above the card reader writer 25 and obtains the operating current, the secure IC chip 15 starts operation by the first clock signal, and the image processing IC chip 16 also starts operation by the third clock frequency. Furthermore, the secure IC chip 15 continues the operation by the first clock signal until the operating frequency change is requested, and the image processing IC chip 16 also continues the operation by the third clock frequency until the operating frequency change is requested.

The card reader writer 25 receives the response signal from the IC card 1, and transmits a card authentication command (step ST1). The processor 151 in operation by the first clock signal senses the card authentication command received via the antenna 13, and requests the operating frequency change (speed up) to the oscillator 156. In the case where control information of the nonvolatile memory 154 includes a command list, under the condition that the card authentication command is included in the command list, the processor 151 in operation by the first clock signal may be designed to request the operating frequency change based on sensing the card authentication command. By applying the operating frequency change information (command list), the operating frequency change processing can be executed for a specific command, such as a command with a heavy load. The oscillator 156 receives the request for the operating frequency change, switches the first clock signal that is being output to the second clock signal, and outputs the second clock signal (step ST2). The processor 151 executes the card authentication processing based on the card authentication command on the basis of the second clock signal (step ST3), returns a card authentication result indicating a card authentication success (OK) or a card authentication failure (NG) via the antenna 13 (step ST4), and requests the operating frequency change (change from the second clock signal to the first clock signal (slow down)) to the oscillator 156. The oscillator 156 receives the request for the operating frequency change, switches the second clock signal that is being output to the first clock signal, and outputs the first clock signal (step ST5).

The determination result of the residual capacity of the charge unit 18 on the basis of the capacity threshold included in the operating frequency change information of the nonvolatile memory 154 may also be added to the applicable condition of the operating frequency change processing. For example, the processor 151 in operation by the first clock signal senses the card authentication command, requests the operating frequency change (speed up) in the case where the residual amount of the charge unit 18 is higher than the capacity threshold, and does not request the operating frequency change in the case where the residual amount of the charge unit 18 is equal to or lower than the capacity threshold. The capacity threshold may also be set so that a state in which the residual capacity is higher than the capacity threshold is a fully charged state with respect to the performance of the charge unit 18. This can reduce the risk of failing to execute card authentication processing due to the lack of current.

The determination result of the current value obtained by the non-contact power supply on the basis of the current threshold included in the operating frequency change information of the nonvolatile memory 154 may also be added to the applicable condition of the operating frequency change processing. For example, the processor 151 in operation by the first clock signal senses the card authentication command, requests the operating frequency change (speed up) in the case where the current value obtained by the non-contact power supply is higher than the capacity threshold, and does not request the operating frequency change in the case where the current value obtained by the non-contact power supply is equal to or lower than the capacity threshold. This can reduce the risk of failing to execute card authentication processing due to the lack of current.

When the card reader writer 25 receives the card authentication result indicating the card authentication success (OK) from the IC card 1, a fingerprint authentication command is transmitted (step ST6). When receiving the card authentication result indicating the card authentication failure (NG) from the IC card 1, the processing ends at this point.

The processor 151 in operation by the first clock signal senses the fingerprint authentication command received via the antenna 13, and requests the operating frequency change (speed up) to the oscillator 156. In the case where operating frequency change information of the nonvolatile memory 154 includes a command list, under the condition that the fingerprint authentication command is included in the command list, the processor 151 in operation by the first clock signal may be designed to request the operating frequency change based on sensing the card authentication command. The oscillator 156 receives the request for the operating frequency change, switches the first clock signal that is being output to the second clock signal, and outputs the second clock signal (step ST7). In step ST7, the determination result of the residual capacity of the charge unit 18, or the determination result of the current value obtained by the non-contact power supply may be added to the applicable condition of the operating frequency change processing.

The processor 151 executes the fingerprint authentication processing based on the fingerprint authentication command on the basis of the second clock signal (step ST8), and requests the operating frequency change (changing the second clock signal to the first clock signal (slow down)) to the oscillator 156. The oscillator 156 receives the request for the operating frequency change, switches the second clock signal that is being output to the first clock signal, and outputs the first clock signal (step ST9). For example, in the fingerprint authentication processing, the registered fingerprint image template is confirmed as being registered in the nonvolatile memory 154, and control information to be output to the image processing IC chip 16 is generated. For example, the control information includes a fingerprint image processing command and clock frequency control information. The fingerprint image processing command requests the image acquisition processing and feature extraction processing to be executed, and the clock frequency control information requests operating based on the third clock signal when not during an execution period of the processing corresponding to the fingerprint image processing command, operating based on the fourth clock signal when during the execution period of the processing corresponding to the fingerprint image processing command, switching from the third clock signal to the fourth clock signal to correspond to the execution of the processing corresponding to the fingerprint image processing command, and switching from the fourth clock signal to the third clock signal to correspond to the end of the processing corresponding to the fingerprint image processing command, etc. The image acquisition processing and the feature extraction processing are processing indirectly corresponding to the fingerprint authentication command.

The processor 151 in operation by the first clock signal transmits the control information including the fingerprint image processing command and the clock frequency control information, etc. to the image processing IC chip 16 based on the fingerprint authentication command (step ST10). The processor 161 of the image processing IC chip 16 requests the operating frequency change (speed up) to the oscillator 166 based on the clock frequency control information included in the control information. The oscillator 166 receives the request for the operating frequency change, switches the third clock frequency that is being output to the fourth clock frequency, and outputs the fourth clock frequency (step ST11). In step ST11, the determination result of the residual capacity of the charge unit 18, or the determination result of the current value obtained by the non-contact power supply may be added to the applicable condition of the operating frequency change processing.

Based on the fourth clock frequency, the processor 161 executes the image acquisition processing that acquires the read fingerprint image output from the fingerprint sensor (step ST12). Furthermore, based on the fourth clock frequency, the processor 161 extracts a plurality of features from the read fingerprint image output from the fingerprint sensor 17, and executes the feature extraction processing that generates the read fingerprint image template based on the plurality of features (step ST13). Furthermore, based on the fourth clock frequency, the processor 161 transmits the read fingerprint image template to the secure IC chip 15 (step ST14). Furthermore, based on the clock frequency control information included in the control information, the processor 161 requests the operating frequency change (changing from the fourth clock frequency to the third clock frequency (slow down)) to the oscillator 166. The oscillator 166 receives the request for the operating frequency change, switches the fourth clock frequency that is being output to the third clock frequency, and outputs the third clock frequency (step ST15).

The processor 151 in operation by the first clock signal receives the read fingerprint image template from the image processing IC chip 16, and requests the operating frequency change (speed up) to the oscillator 156. The oscillator 156 receives the request for the operating frequency change, switches the first clock signal that is being output to the second clock signal, and outputs the second clock signal (step ST16).

Based on the second clock signal, the processor 151 executes collation processing (step ST17). In the collation processing, the processor 151 collates the registered fingerprint image template that is registered in the nonvolatile memory 154 with the received read fingerprint image template, calculates the degree of similarity, and, based on the calculation result of the degree of similarity, determines the fingerprint authentication success or the fingerprint authentication failure. The processor 151 returns the fingerprint collation result indicating the fingerprint authentication success or the fingerprint authentication failure (step ST18) to the fingerprint authentication command transmitted from the card reader writer 25 (step ST6), and requests the operating frequency change (changing the second clock signal to the first clock signal (slow down)) to the oscillator 156. The oscillator 156 receives the request for the operating frequency change, switches the second clock signal that is being output to the first clock signal, and outputs the first clock signal (step ST19).

A summary of the operating frequency change explained above is as follows.

(1) Each IC chip (for example, the secure IC chip 15 and the image processing IC chip 16) of the IC card 1 operates by the first clock signal (a standard clock signal) with a low frequency when not during the execution period of the processing corresponding to the command, and operates by the second clock signal (a clock signal with a higher frequency than the standard) with a high frequency when during the execution period of the processing corresponding to the command. Regardless of whether or not it is during the execution period of the processing corresponding to the command, the IC chip can operate more efficiently with low power compared to the case in which each IC chip is operated by the clock signal of the same frequency. By applying the operating frequency change processing in a case where the periods of the processing corresponding to the command in each IC chip do not overlap, the IC chip can operate efficiently with low power in a more effective manner.

(2) The IC chip (for example, the secure IC chip 15) that functions as a master among each of the IC chips collectively controls the operating frequency change processing in each of the IC chips. For example, the IC chip functioning as the master can control switching of frequencies at a start timing and an end timing of each command processing in each of the IC chips. Each command processing executed by a different timing in each of the IC chips is performed by a clock signal with high frequency, and, during a command processing waiting period in each of the IC chips, the IC chip can be operated by a clock signal with low frequency. By collectively controlling the operating frequency change by the IC chip functioning as the master, power consumption can be reduced without deteriorating the entire performance of the IC card 1.

(3) Each of the IC chips of the IC card 1 can apply the operating frequency change processing in accordance with the received command. For example, by registering a command that commands image processing with a heavy load, etc. on the command list as a target of the operating frequency change processing, electric power consumption can be suppressed without delaying the processing. Furthermore, by registering a command in which the processing period does not overlap in each IC chip on the command list, electric power consumption can be suppressed more effectively without delaying the processing.

(4) Each of the IC chips of the IC card 1 can apply the operating frequency change processing in accordance with the residual capacity of the charge unit 18. For example, in the case where the residual capacity of the charge unit 18 is higher than the capacity threshold, the operating frequency change processing is applied (speed up), and, in the case where the residual capacity of the charge unit 18 is equal to or lower than the capacity threshold, the operating frequency change processing is not applied.

(5) Each of the IC chips of the IC card 1 can apply the operating frequency change processing in accordance with the current value of the non-contact power supply. For example, in the case where the current value of the non-contact power supply is higher than the current threshold, the operating frequency change processing is applied (speed up), and, in the case where the current value of the non-contact power supply is equal to or lower than the current threshold, the operating frequency change processing is not applied.

In the present embodiment, a case in which the operating frequency change processing is applied to the image processing, etc. of the read fingerprint image read by the fingerprint sensor 17 is explained. However, the operating frequency change processing is not limited to the fingerprint sensor 17, and may also be applied to heavy-loaded processing executed by a high-performance IC card that comprises a sensor, a display, and a button, etc. as in other camera elements.

According to the present embodiment, the following requests can be met.

For example, the high-performance IC card comprises two IC chips, and each of the IC chips share the function. In such high-performance IC card, if the frequency of the oscillator inside each of the IC chips is simply reduced, there is a possibility that the processing performance may not fulfill the standard. In the future, also in view of enhancing performance of the IC card, a technique to suppress electric power consumption while maintaining constant processing performance is desired.

According to the present embodiment, an IC card and a portable electronic device that can suppress electric power consumption while maintaining constant processing performance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable electronic device comprising:
an antenna;
a first oscillator configured to output a first clock signal of a first frequency, and output a second clock signal of a second frequency that is higher than the first frequency as requested;
a first processor configured to operate by a current induced electromagnetically in the antenna, operate based on the first clock signal when not during an execution period of first processing corresponding to a reception command received by the antenna, request the second clock signal for executing the first processing, execute the first processing based on the second clock signal of the first oscillator that receives the request, and instruct to execute second processing corresponding to the reception command received by the antenna;
a second oscillator configured to output a third clock signal of a third frequency, and output a fourth clock signal of a fourth frequency that is higher than the third frequency as requested; and
a second processor configured to operate by a current induced electromagnetically in the antenna, operate based on the third clock signal when not during an execution period of the second processing, request the fourth clock signal for executing the second processing based on an instruction to execute the second processing from the first processor, and execute the second processing based on the fourth clock signal of the second oscillator that receives the request.

2. The portable electronic device according to claim 1, wherein the first processor is configured to output to the second processor an instruction for requesting the fourth clock signal for executing the second processing.

3. The portable electronic device according to claim 1, wherein the first processor is configured to request the second clock signal to be switched to the first clock signal after the first processing.

4. The portable electronic device according to claim 1, wherein the first processor is configured to output to the second processor an instruction for requesting the fourth clock signal to be switched to the third clock signal after the second processing.

5. The portable electronic device according to claim 1 comprising:
a charge unit configured to be charged by a current induced electromagnetically in the antenna, wherein
the first and second processors operate by the current from the charge unit, and
in a case where a residual capacity of the charge unit is higher than a capacity threshold, the first processor is configured to request the second clock signal for executing the first processing.

6. The portable electronic device according to claim 5, wherein in a case where a residual capacity of the charge unit is higher than a capacity threshold, the first processor is configured to output to the second processor an instruction for requesting the fourth clock signal for executing the second processing.

7. The portable electronic device according to claim 1, wherein the second processor is configured to execute the second processing corresponding to image processing based on the fourth clock signal.

8. The portable electronic device according to claim 1 comprising:
a fingerprint sensor, wherein
the second processor is configured to execute the second processing for processing an image from the fingerprint sensor based on the fourth clock signal.

9. An IC card comprising:
an antenna;
a first oscillator configured to output a first clock signal of a first frequency, and output a second clock signal of a second frequency that is higher than the first frequency as requested;
a first processor configured to operate by a current induced electromagnetically in the antenna, operate based on the first clock signal when not during an execution period of first processing corresponding to a reception command received by the antenna, request the second clock signal for executing the first processing, execute the first processing based on the second clock signal of the first oscillator that receives the request, and instruct to execute second processing corresponding to the reception command received by the antenna;
a second oscillator configured to output a third clock signal of a third frequency, and output a fourth clock signal of a fourth frequency that is higher than the third frequency as requested; and a second processor configured to operate by a current induced electromagnetically in the antenna, operate based on the third clock signal when not during an execution period of the second processing, request the fourth clock signal for executing the second processing based on an instruction to execute the second processing from the first processor, and execute the second processing based on the fourth clock signal of the second oscillator that receives the request.

* * * * *